United States Patent

Stephens et al.

[11] Patent Number: 5,859,513
[45] Date of Patent: Jan. 12, 1999

[54] STARTING AND SYNCHRONIZING SYSTEM FOR LINE-START PERMANENT MAGNET MOTOR

[75] Inventors: Charles Michael Stephens, Pattersonville; Paul Michael Szczesny, Ballston Lake, both of N.Y.

[73] Assignee: General Electric Company, Schenectady, N.Y.

[21] Appl. No.: 42,374

[22] Filed: Mar. 13, 1998

[51] Int. Cl.[6] .................................................. H02P 1/50
[52] U.S. Cl. .................................... 318/430; 318/705
[58] Field of Search ................ 318/430, 431, 318/700, 705, 778, 830, 832; 310/112

[56] References Cited

U.S. PATENT DOCUMENTS

| | | | |
|---|---|---|---|
| 4,459,530 | 7/1984 | Klatt | 318/732 |
| 4,876,491 | 10/1989 | Squires et al. | 318/138 |
| 5,761,376 | 6/1998 | Gering | 388/844 |

*Primary Examiner*—Bentsu Ro
*Attorney, Agent, or Firm*—Marvin Snyder; Douglas E. Stoner

[57] ABSTRACT

A system for preventing objectionable large torque pulsations during the starting and synchronization of a line-start permanent magnet motor compares motor speed with motor synchronous speed and power source phase with the motor back-emf phasor. The motor starting armature is coupled to the power source and the PM armature is disconnected from the power source before motor speed has reached to within a predetermined margin of synchronous speed and before the back-emf phasor has dropped below a predetermined phase difference. After motor speed has approached synchronous speed to within the margin and the phase difference has dropped below the predetermined phase difference, connections are reversed so that the starting armature is disconnected from the power source and the PM armature is coupled to the power source.

11 Claims, 5 Drawing Sheets

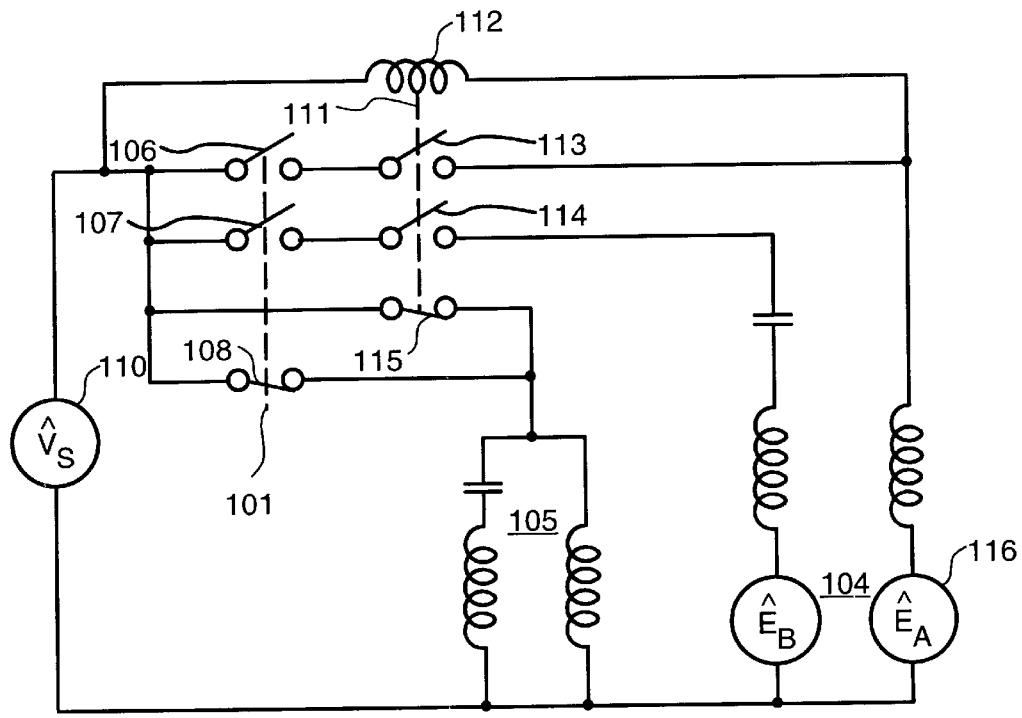
FIG. 1
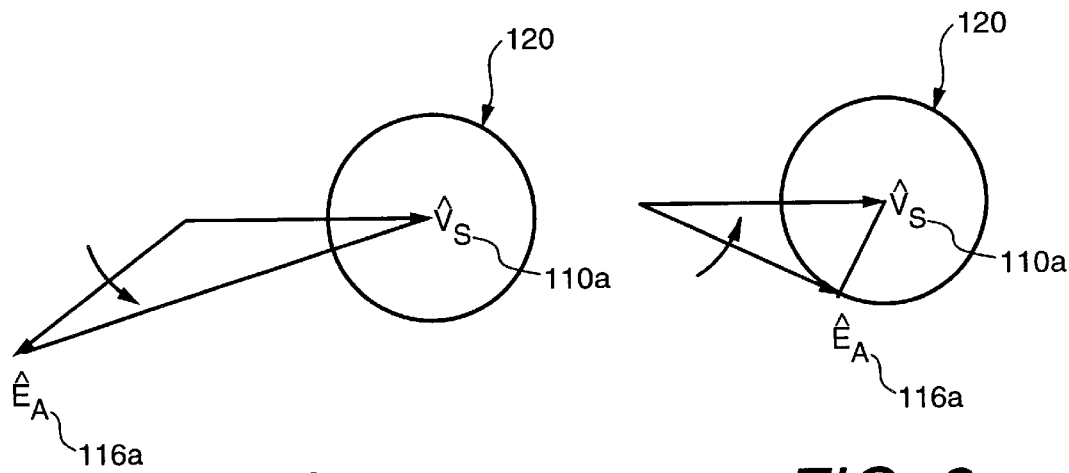
FIG. 2   FIG. 3

STARTING AND SYNCHRONIZING SYSTEM FOR LINE-START PERMANENT MAGNET MOTOR

FIELD OF THE INVENTION

This invention relates to permanent magnet motors, and more specifically, to preventing objectionably large torque pulsations during starting and synchronization of line-start permanent magnet motors.

BACKGROUND OF THE INVENTION

In a line-start permanent magnet (PM) motor having a rotor cage and a starting armature in addition to a PM armature, the starting armature is wound with at least one fewer pole-pair than the PM armature, and thereby does not couple with the rotor magnets. The starting armature accelerates the motor rotor by induction action on the rotor cage, and when the motor obtains synchronous speed, the power source is switched to the PM armature. Since the rotor magnets do not couple to the starting armature, large torque pulsations arising from non-synchronous magnet interaction are precluded during the starting period.

It was originally desired to have a centrifugal relay transfer the power source from the starting armature to the PM armature. At the moment that a centrifugal relay operates, the alignment of the motor back-emf phasors with respect to the power source phasor is random by nature. Dynamic simulations indicate that there are preferable alignments of the back-emfs at the moment of connection, and that non-preferable alignments will produce large torque pulsations, little different from the torque pulsations that the starting armature was intended to prevent. The large torque pulsations can be acoustically objectionable, and can cause mechanical failure of components. The electromagnetic conditions that cause the torque pulsations can also cause demagnetization of the magnets.

Use of a centrifugal relay which only detects the frequency of the PM armature back-emf for the PM motor starting function is not sufficient because synchronization depends on a correct phase relationship between line voltage and the PM armature back-emf. To a first approximation, a preferable synchronization occurs when the back-emf phasor of the PM armature regular phase (the phase without a capacitor) is aligned with the source phasor, and the worst synchronization occurs when the back-emf phasor of the regular phase is 180 degrees out of alignment with the source phasor.

SUMMARY OF THE INVENTION

In a starting and synchronizing system for a line-start permanent magnet motor having a starting armature and a PM armature, the motor speed is compared with the motor synchronous speed and the power source phase is compared with the motor back-emf phasor.

The starting armature is coupled to the power source and the PM armature is disconnected from that power source while the motor speed approaches synchronous speed to within a predetermined margin and the phase difference between the power source and the back-emf phasor drops below a predetermined phase difference.

After motor speed has approached synchronous speed to within the margin, and the phase difference between the power source and the back-emf phasor has dropped below the predetermined phase difference, all connections are reversed, so that the starting armature is disconnected from the power source and the PM armature is now coupled to the power source.

Some embodiments include phase shifting and/or signal attenuation. Both electromechanical and electronic embodiments of this invention are disclosed. One embodiment employs digital signal electronics as well, centered around use of a set-reset flip-flop to control activation and deactivation of the starting and PM armatures.

BRIEF DESCRIPTION OF THE DRAWING

FIG. 1 is a schematic diagram illustrating the most fundamental form of a line-start and synchronizing system of the invention, while FIGS. 2 and 3 graphically illustrate operation of a phasor alignment relay in the system of FIG. 1.

FIG. 4 is a schematic diagram showing a phase shift network introduced into the system of FIG. 1 to achieve improved synchronization, while

DETAILED DESCRIPTION OF THE INVENTION

Figure 4:
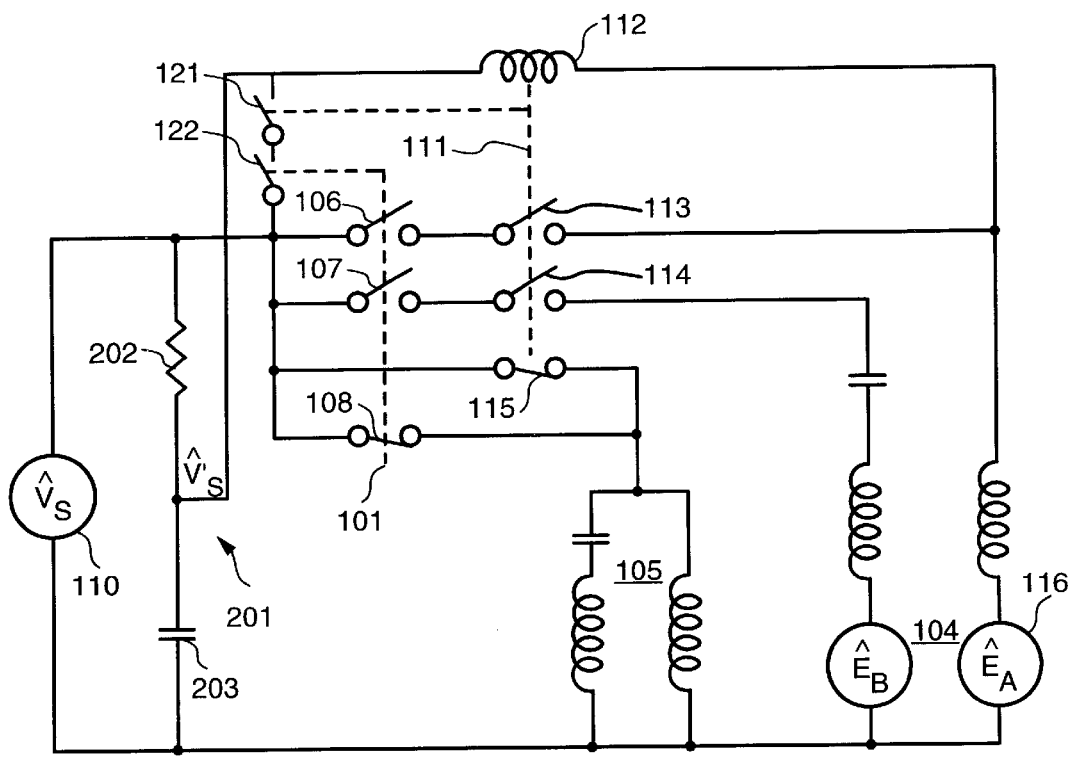

FIG. 1 illustrates a centrifugal relay 101, having contacts 106, 107, 108, and an electromechanical phasor alignment relay 111, comprising an actuating coil 112 for operating contacts 113, 114, 115. The illustrated positions of the contacts correspond to the situation shortly after the voltage $\hat{V}_s$ of a power source 110 is applied to the circuit. A motor PM armature 104 is disconnected, a starting armature 105 is connected, and the motor rotor is accelerating from rest.

Centrifugal relay 101 is set to operate at a predetermined speed close to synchronous speed. The operation (reversal of contacts) of centrifugal relay 101 closes one set of series contacts 106, 107 to PM armature 104, and opens one contact 108 in parallel with starting armature 105. PM armature 104, however, remains deenergized because contacts 113 and 114, in series with contacts 106 and 107, are still open, the starting armature is still connected because contact 115 is still closed, and the rotor is still accelerating. The system is now waiting for the phasors to come into alignment, a condition detected by phasor alignment relay 111.

Coil 112 of phasor alignment relay 111 is coupled between source 110 and the motor regular phase $\hat{E}_A$ ("back-emf phasor.") When there is a large phase difference between the power source voltage and the back-emf phasor, the voltage across relay coil 112 is large enough to hold contacts 113, 114, 115 of relay 111 in the position shown in FIG. 1. When the phase difference between the two phasors $\hat{V}_s$ and $\hat{E}_A$ becomes small, the voltage across relay coil 112 is small, causing the armature of phasor relay 111 to drop out and its contacts 113, 114, and 115 to change position. This completes the connection of PM armature 104 by closing the remaining series of contacts 113, 114, and completes the disconnection of the starting armature by opening the remaining parallel contact 115. The contacts comprising both centrifugal relay 101 and phasor alignment relay 111 must all reverse from their initial positions in order for the starting armature to disconnect and the PM armature to connect. Reversal of one or the other set of contacts, but not both, maintains the starting armature connection and the PM armature disconnection.

Separate lines of contacts are needed for the two phases $\hat{E}_A$ and $\hat{E}_B$ of PM armature 104 to prevent the PM armature from being short-circuited, where it would induce a large current and drag torque.

Circles 120 around the head of source phasor $\hat{V}_S$ 110a, shown in FIGS. 2 and 3, illustrate the operating zone of phasor alignment relay 111. As shown in FIGS. 2 and 3, which depict operation of the phasor alignment relay, when the back-emf phasor $\hat{E}_A$ 116a enters operating zone 120 of phasor alignment relay 111 while moving toward $\hat{V}_S$, phasor alignment relay 111 drops out to reverse the positions of its contacts. This relay, therefore, actually operates on the phasor difference, which accounts for magnitude difference as well as phase angle difference. Because magnitude of the back-emf phasor $\hat{E}_A$ is proportional to speed, the relay will not operate during the initial portion of the starting acceleration, even when the phasors may be aligned.

As motor speed increases during the starting acceleration, it is likely that before centrifugal relay 101 operates, phasor alignment relay 111 will go in and out of operation as the back-emf phasor $\hat{E}_A$ 116a sweeps in and out of the radially-inward portion of operating zone 120 of phasor alignment relay 111. This in itself does nothing, because of the doubled arrangement of the contacts. It is acceptable for the centrifugal relay to operate after the phasor alignment relay operates, and this is merely the alternate sequence of contact operation.

Figure 5:
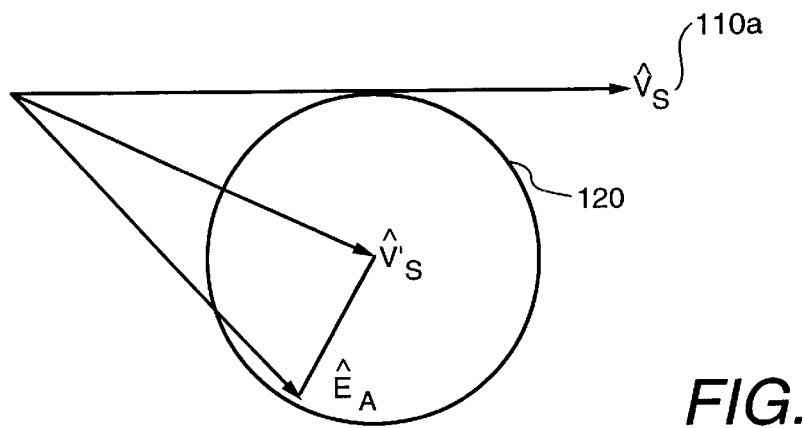
FIG. 5 is a phasor diagram illustrating operation of this phase shift network.

Operating zone 120 of phasor alignment relay 111 is symmetrical about source phasor $\hat{V}_S$ 110a, and will therefore provide initial phase differences at the moment of connection that are symmetric about the source phasor. However, a survey of motor synchronization simulations indicates that the optimal range of phase difference is actually centered behind source phasor $\hat{V}_S$ 110a. Phasor alignment relay 111, therefore, should preferably be referenced to a new phasor that lags behind source phasor $\hat{V}_S$ 110a by a predetermined, desired angle, typically about 20 degrees. This can be easily accomplished, as illustrated in FIG. 4, by coupling a phase-shift network 201 across the source, and referencing phasor alignment relay 111 to phase-shift network 201. The amount of phase shift is determined by comparative values of a resistor 202 and capacitor 203 comprising network 201. Electromechanical relay coil 112 is referenced between the resistor and capacitor, while its contacts are referenced directly to source 110. A small amount of attenuation is also produced by this arrangement. If additional attenuation is desired, for example, to match the magnitudes of back-emf phasor $\hat{E}_A$ 116a and source phasor $\hat{V}_S$ 110a, capacitor 203 may be split into a capacitive voltage divider with phasor alignment relay 111 referenced to the midpoint of the divider. Two additional relay hold contacts 121 and 122 are used to ensure that phasor alignment relay 111 is held in its inactive state after the PM armature is connected. FIG. 5 graphically illustrates how phase shift network 201 relocates the operating zone 120 of phasor alignment relay 111.

Because operation of phasor alignment relay 111 incorporates a sense of the motor speed, and since the motor back-emf $\hat{E}_A$ 116a is proportional to speed, centrifugal relay 101 can be omitted, especially if the magnitude of back-emf phasor $\hat{E}_A$ 116a at synchronous speed is significantly smaller than the magnitude of source phasor $\hat{V}_S$ 110a; however, if it isn't, back-emf phasor $\hat{E}_A$ 116a can be attenuated with a simple resistive voltage divider. Furthermore, the desirable phase shift, referred to in the previous paragraph, can be incorporated into the back-emf attenuator, allowing the source phase shift network of FIG. 4 to be eliminated.

Figure 6:
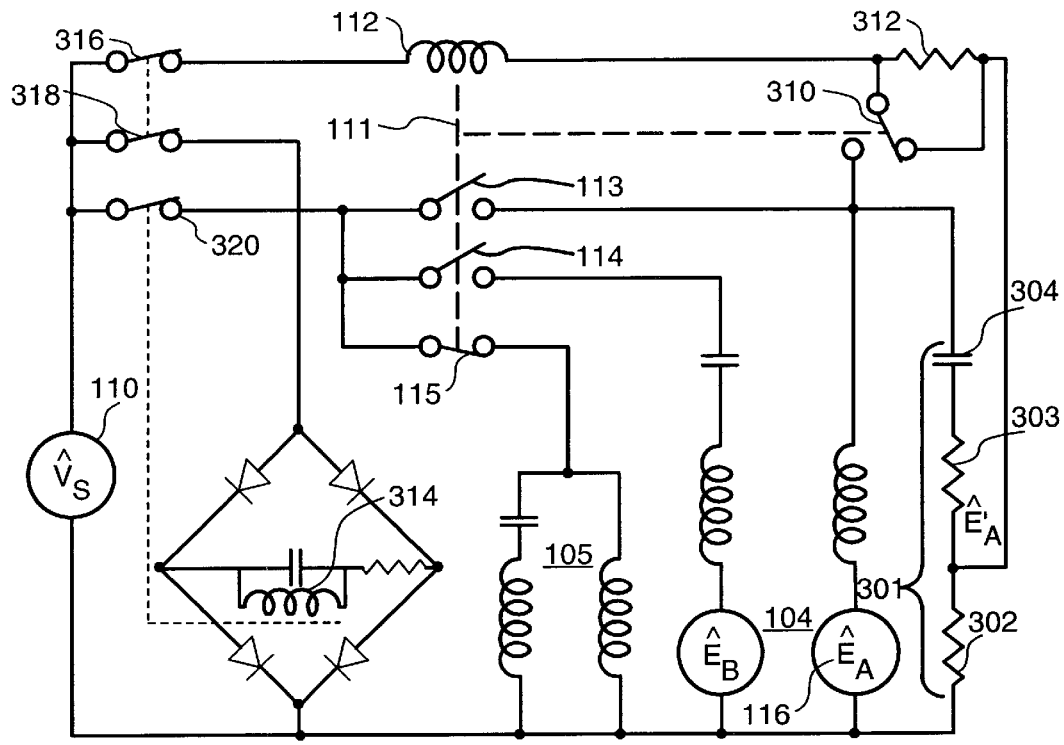
FIG. 6 is a schematic diagram showing a phase shift and attenuation network introduced into the system of FIG. 1, which results in elimination of a centrifugal relay from the system.

FIG. 6 illustrates the circuit of this system, including a phase-shift and attenuation network 301 comprising, in series, two resistors 302 and 303 and a capacitor 304, with one side of coil 112 referenced to a junction of the two resistors and the other side of coil 112 referenced to source 110, with capacitor 304 referenced to switch 113, the same as the head of back-emf phasor $\hat{E}_A$ 116a, and resistor 302 referenced to the circuit common, the tail of back-emf phasor $\hat{E}_A$ 116a. A holding contact 310 ensures that phasor alignment relay 111 is held inactive after the PM armature is connected. A power loss reduction resistor 312 is used to reduce any power loss in resistor 302. Ganged on-off contacts 316 and 318 activate the coil of the phasor alignment relay 112 and the time delay relay 314, respectively. After sufficient time delay, during which the contacts 113, 114, and 115 of the phasor alignment relay 111 are allowed to set to the necessary initial positions, the time delay relay 314 acts to close contact 320, applying power to the motor contact arrangement 113, 114, and 115.

Figure 7:
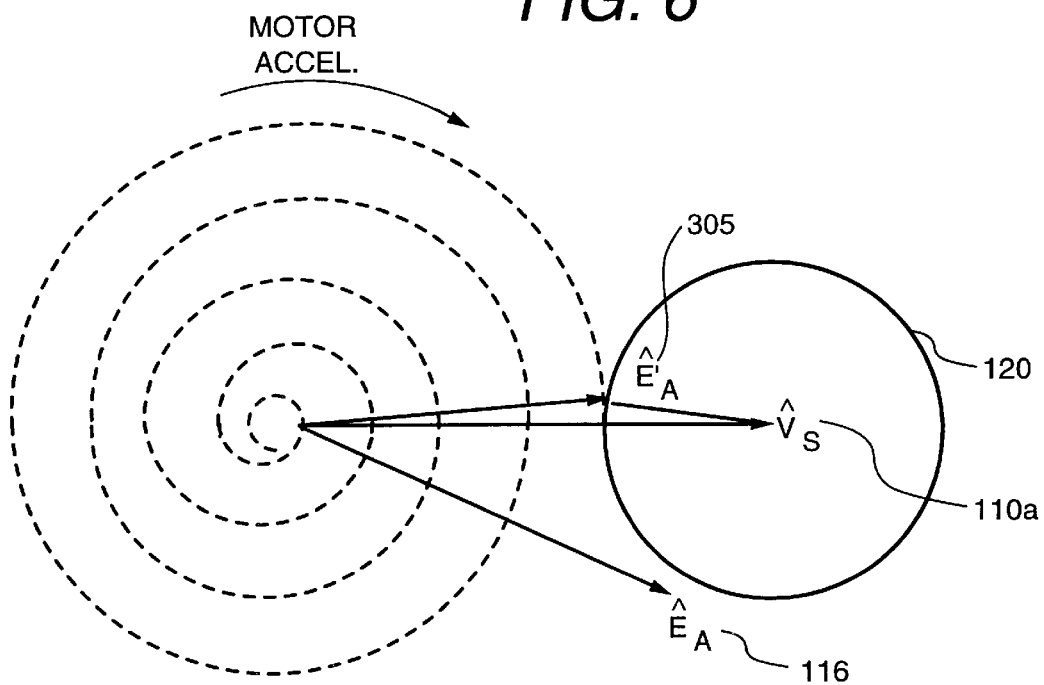
FIG. 7 is a phasor diagram illustrating the preferred relationship between the phasors and relay operating zone in the system of FIG. 6.

FIG. 7 illustrates the preferable relationship of the phasors and relay operating zone. The attenuation of back-emf companion phasor $\hat{E}_A'$ 305 is designed so that it can enter the phasor relay operating zone 120 at speeds slightly below synchronous speed. Back-emf companion phasor $\hat{E}_A'$ spirals outward as the motor accelerates, and then enters the relay operating zone 120.

Figure 8:
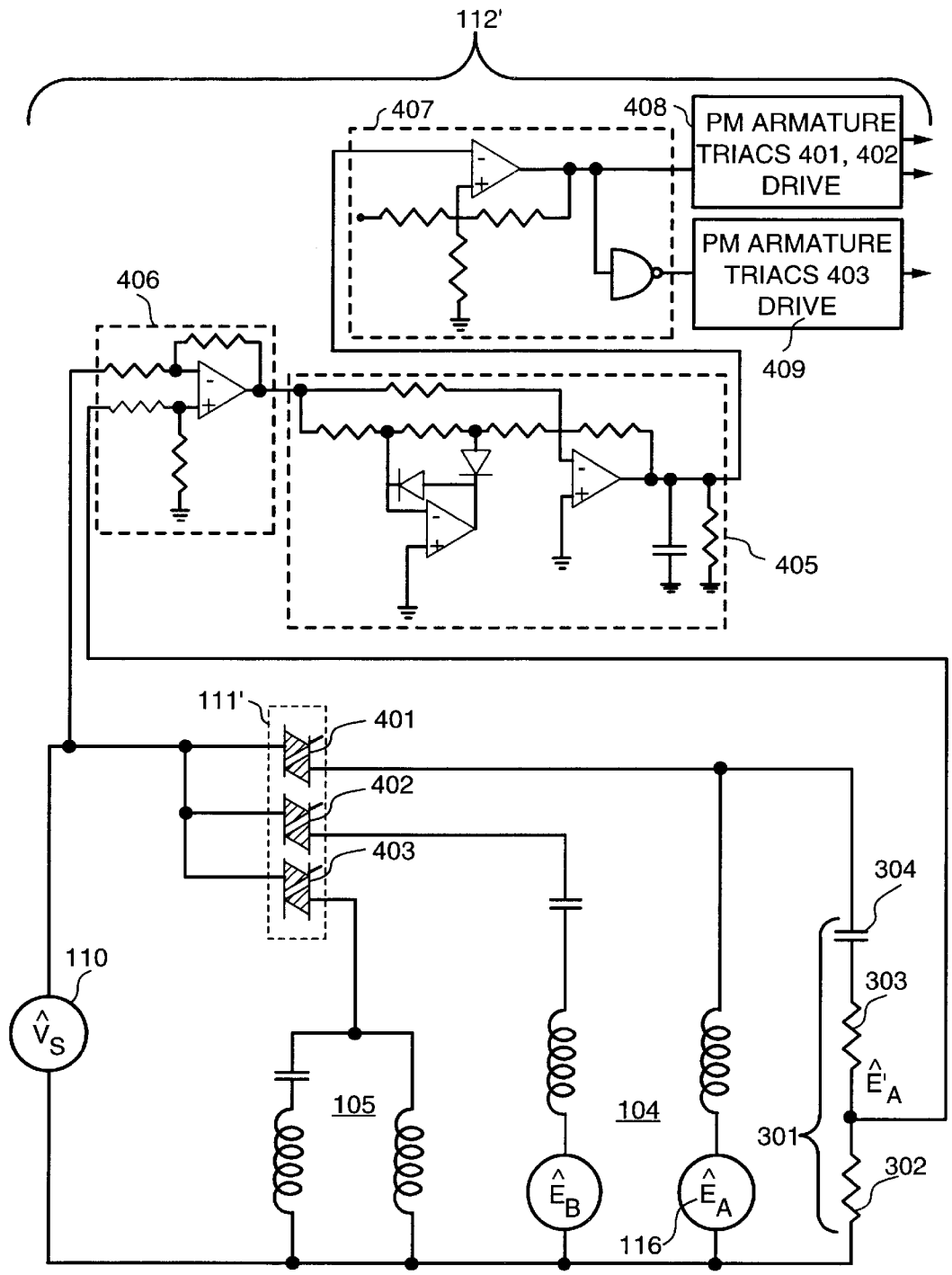
FIG. 8 is a schematic diagram illustrating an electronic implementation of the network of FIG. 6.

The concepts described here are easily implemented in electronic form. FIG. 8 illustrates an electronic implementation of the circuit of FIG. 6, for example. Contacts 113, 114, 115 are replaced with triacs 401, 402, 403 which provide the same electronic functionality (electronic phasor alignment system) 111' as the phasor alignment relay 111, and relay coil 112 is replaced with classical operational amplifier circuits 112', which, in the embodiment depicted, include a rectifier-filter 405, a differential amplifier 406, and an inverting Schmitt trigger 407, controlling a PM armature triac drive 408 and a starting armature triac drive 409.

Figure 9:
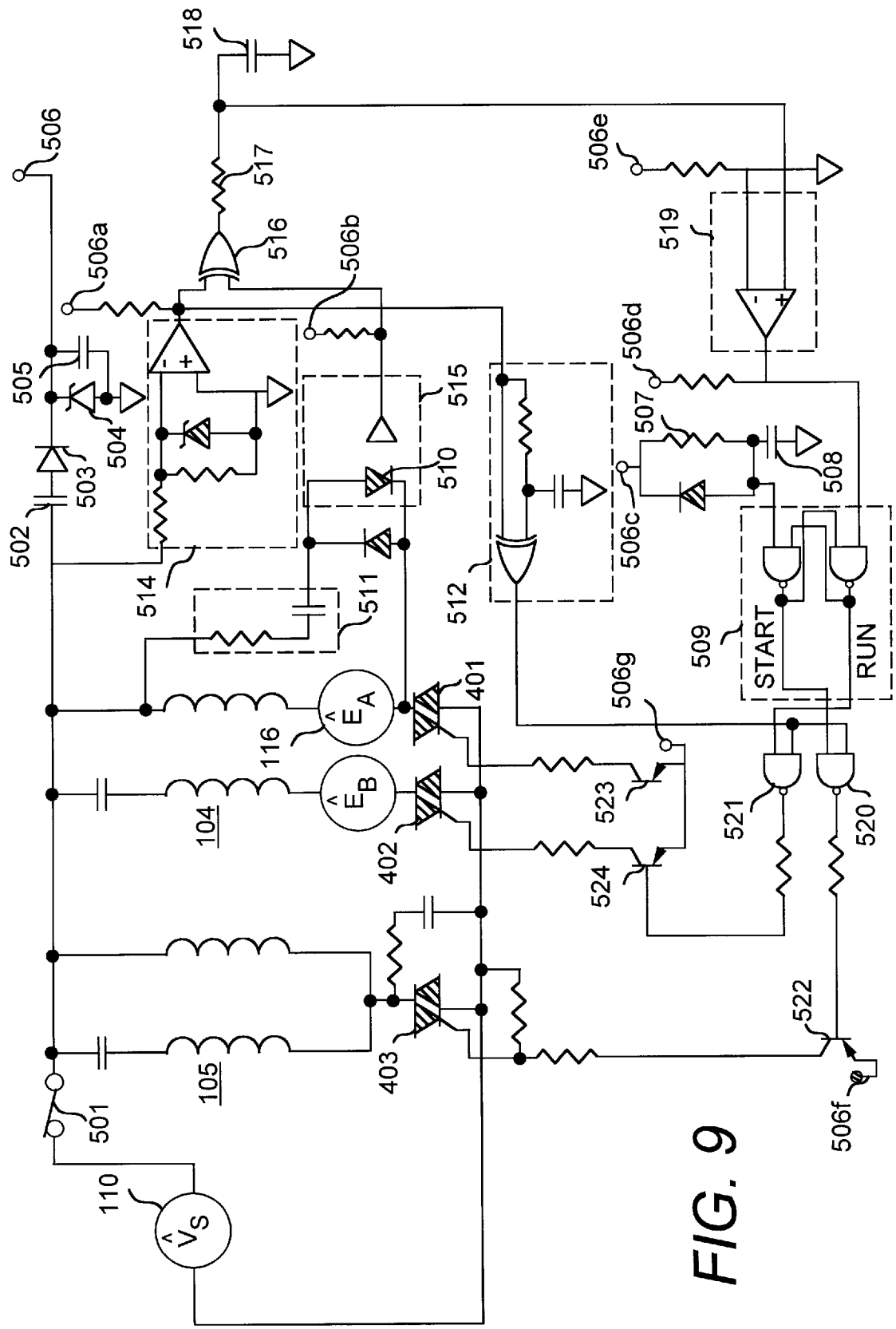
FIG. 9 is a schematic diagram illustrating an alternative embodiment for an electronic implementation of the invention.

FIG. 9 illustrates an alternative embodiment of a low cost circuit that implements the function of the circuit of FIG. 3 with digital electronics. Upon application of AC source 110 (switch 501 closed) the logic power supply comprised of capacitor 502, diode 503, zener diode 504, and capacitor 505 is energized to produce a DC voltage, such as 15 volts, for example, at a terminal 506 and made available at terminals 506 a–g. A resistor 507 and capacitor 508 provide a power up reset signal (logical '0') to a set-reset flip-flop 509 which forces a START output signal to be true and a RUN output signal to be false. The START signal is gated with a pulse train from an Exclusive OR circuit 512 to provide gate trigger pulses to a starting armature triac 403 to energize starting armature 105 of the motor. The line voltage of power source 110 is converted to a logic signal by a comparator 514; that is, comparator 514 produces a logical '1' during the positive half cycle of the sensed voltage and a logical '0' during the negative half cycle. These logical '1's and '0's are supplied to one input of Exclusive OR circuit 512 which generates the gate trigger pulses for starting armature triac 403 whenever the logical '1's and '0's are above a predetermined bias level maintained at the second input of Exclusive OR circuit 512. The gate trigger pulses are supplied through an AND gate 520 receiving the START signal from flip-flop 509, to triac 403 through a PNP amplifying transistor 522. The back-emf voltage $\hat{E}_A$ 116 of PM armature 104 is converted by an opto-coupler binary comparator 515. More specifically, at low speeds the amplitude and frequency of the back-emf is low and the current in light emitting diode 510 of the opto-coupler comparator is below the trigger level so that the output signal of the opto-coupler comparator is at logical '0'. At this condition, the output signal of a phase comparator Exclusive OR gate 516 matches the logical representation of the line voltage (e.g., a 60 Hz square wave). The output signal of phase comparator 516 is RC filtered by a resistor 517 and capacitor 518 with a sufficiently long time constant (e.g., approximately 0.25 seconds) to generate the average value of the output signal of phase comparator 516.

As motor speed increases, back-emf voltage $\hat{E}_A$ 116 and frequency increase, and the currents in the LED of opto-coupler comparator 515 are sufficient to trigger opto-coupler comparator 515 to produce a logic signal representing the phase-shifted back-emf voltage. The phase shifting is performed by an R-C network 511 coupling back-emf voltage $\hat{E}_A$ 116 to opto-coupler 515. Exclusive OR gate 516 performs the phase comparator function, and the average value of its output signal is directly related to the phase difference between its two input signals. The average value of the phase error obtained by filtering the output voltage of Exclusive OR gate 516 with an RC filter comprised of a resistor 517 and a capacitor 518 is compared to a predetermined value by an analog comparator 519 which supplies a logical '0' to set-reset flip-flop 509 when the phase error is below the preset value, forcing the START signal of flip-flop 509 to be false and the RUN signal to be true. This in turn removes the gate pulses from starting armature triac (start winding switch) 403 and applies gate pulses to PM armature triacs 402 and 401 to energize PM windings 104. The gate pulses to triacs 402 and 401 are supplied through an AND gate 521 receiving the RUN signal from flip-flop 509, through PNP amplifying transistors 523 and 524, respectively. The synchronization achieved between the line and the back-emf voltages at the moment of transition between the start and the run mode ensures that the torque transient will be small.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. A starting and synchronizing system for a line-start permanent magnet motor including a starting armature and a PM armature, comprising:

motor speed detection and comparison means for detecting speed of said motor and comparing said speed with synchronous speed of said motor;

phase detection and comparison means for detecting phase of a power source and a back-emf phasor of said motor, comparing said phases, and determining a difference between said phases; and switching means for coupling said power source to a starting armature of said motor prior to achieving a predetermined motor speed close to said synchronous speed and prior to the phase difference between said power source and said back-emf phasor dropping below a predetermined phase difference, and disconnecting said power source from said starting armature and coupling said power source to said PM armature after said predetermined motor speed close to said synchronous speed has been achieved and after said phase difference between said power source and said back-emf phasor has dropped below said predetermined phase difference.

2. The system of claim 1, wherein:

said motor speed detection and comparison means comprises a centrifugal relay; and said phase detection and comparison means comprises a phasor alignment relay including a relay coil.

3. The system of claim 2 including a phase shift network coupling said power source to said switching means for relocating an operating zone of said phasor alignment relay.

4. The system of claim 1 wherein said phase detection and comparison means comprises a phasor alignment relay including a relay coil, and further including a phase shift and attenuation network said phase shift and attenuation network comprising:

first and second series-connected resistors; and a capacitor coupled in series with said first and second resistors;

said relay coil being coupled between a junction of said first and second resistors and said power source.

5. The system of claim 1 wherein said switching means comprises an electronic phasor alignment system including a set of phasor alignment triacs, two of said triacs being coupled between said power source and said PM armature and a third one of said triacs being coupled between said power source and said starting armature;

a phase shift and attenuation network coupled across one phase ($\hat{E}_A$) of said PM armature;

a differential amplifier responsive to said power source and said phase shift and attenuation network for producing an output voltage representative of the difference in voltage between said power source and said phase shift and attenuation network;

an inverting Schmitt trigger coupled to said differential amplifier;

a PM armature triacs drive coupled to a noninverting output of said Schmitt trigger; and a starting armature triacs drive coupled to an inverting output of said Schmitt trigger, said PM armature triacs drive being coupled to a gating input of each of said two triacs and said starting armature triacs drive being coupled to a gating input of said third triac.

6. The system of claim 5 wherein said phase shift and attenuation network comprises:

first and second resistors connected in series, and a capacitor connected in series with said resistors, a junction between said first and second resistors being coupled to an input of said differential amplifier.

7. The system of claim 1 wherein said motor speed detection and comparison means comprises binary output circuit means responsive to a predetermined amplitude of back-emf voltage of said PM armature and said phase detection and comparison means comprises a voltage comparator for producing a logic signal in response to said power source voltage and a phase comparator for comparing the voltage comparator output voltage against output voltage of said binary output circuit means, said system further including:

a set-reset flip-flop for generating start and run logic signals;

a starting armature triac for energizing said starting armature;

a pair of PM armature triacs for energizing said PM armature;

an analog comparator responsive to an average of voltage amplitude produced by said phase comparator for driving said flip-flop in accordance with the level of the average voltage amplitude produced by said phase comparator;

an Exclusive OR circuit for producing a pulse train in response to output signals from said voltage comparator above a predetermined amplitude; and first and second two-input AND gates each having a first input coupled to an output of said Exclusive OR circuit, said first AND gate having a second input coupled to a START output of said flip-flop and said second AND gate having a second input coupled to a RUN output of said flip-flop, said first AND gate output being coupled to provide a gating signal to said starting armature triac and said second AND gate output being coupled to provide a gating signal to each of said PM armature triacs.

8. A method for starting and synchronizing a line-start permanent magnet motor, comprising the steps of:

detecting speed of said motor;

comparing the detected motor speed with synchronous speed of said motor;

detecting the phase of a power source supplying energy to said motor;

determining a back-emf phasor of said motor;

comparing said back-emf phasor against said phase of the power source to obtain any difference therebetween;

coupling said power source to a starting armature of said motor before a predetermined motor speed close to said synchronous speed of said motor is achieved and before said difference in phase between said power source and said back-emf phasor drops below a predetermined value; and disconnecting said power source from said starting armature and coupling said power source to a PM armature of said motor after said predetermined motor speed close to said synchronous speed has been achieved and after said difference in phase between said power source and said back-emf phasor has dropped below said predetermined value.

9. The method of claim 8, including the further steps of:

attenuating said back-emf phasor into a companion phasor such that said companion phasor enters an operating zone of a phasor alignment relay at said motor speed close to said synchronous speed.

10. The method of claim 8 including the further steps of:

attenuating said back-emf phasor into a back-emf companion phasor such that said back-emf companion phasor enters an operating zone of a phasor alignment relay at said motor speed close to said synchronous speed; and activating a plurality of phasor alignment triacs to bring about a reverse in their electronic condition when the phase difference between said power source and said back-emf companion phasor of said motor drops below said predetermined phase difference.

11. The method of claim 10 including the additional steps of:

initially providing a START signal to a starting armature triac of said phasor alignment triacs; and deactivating said START signal and providing a RUN signal to said PM armature of said motor when said difference in phase between said power source and said back-emf companion phasor drops below said predetermined value.

* * * * *